United States Patent
Chauzat et al.

(10) Patent No.: US 6,498,665 B1
(45) Date of Patent: Dec. 24, 2002

(54) SYSTEM FOR ADDING/DROPPING WAVELENGTH DIVISION MULTIPLEXED OPTICAL SIGNALS

(76) Inventors: Corinne Chauzat, 16, rue Jean Mermoz, 91620 Nozay (FR); Paolo Ottolenghi, 19, via Volta-20121, Milano (IT); Stephane Ruggeri, 15, rue André Modebourg, 78114 Magny les Hameaux (FR); Michel Sotom, 9 rue Desnouettes, 75015 Paris (FR)

( * ) Notice: Subject to any disclaimer, the term of this patent is extended or adjusted under 35 U.S.C. 154(b) by 0 days.

(21) Appl. No.: 09/377,747

(22) Filed: Aug. 20, 1999

(30) Foreign Application Priority Data

Aug. 24, 1998 (FR) ............................................. 98 10655

(51) Int. Cl.[7] ................................................ H04J 14/02
(52) U.S. Cl. ........................ 359/127; 359/124; 359/128
(58) Field of Search ................................ 359/127, 128, 359/124

(56) References Cited

U.S. PATENT DOCUMENTS

| | | | |
|---|---|---|---|
| 5,657,406 A | 8/1997 | Ball | 385/24 |
| 6,208,443 B1 * | 3/2001 | Liu et al. | 359/127 |
| 6,219,172 B1 * | 4/2001 | Yariv | 359/181 |

FOREIGN PATENT DOCUMENTS

| | | |
|---|---|---|
| EP | 0 769 859 A1 | 4/1997 |
| EP | 0 838 918 A1 | 4/1998 |
| WO | WO 97/08574 | 3/1997 |
| WO | WO 98/05133 | 2/1998 |

OTHER PUBLICATIONS

Antoniades, N. et al: "Simulation of ASE Noise Accumulation in a Wavelength Add–Drop Multiplexer Cascade" IEEE Photonics Technology Letters, Sep., 1997, IEEE, USA, vol. 9, No. 9, pp. 1274–1276, XP002101306, ISSN 1041–1135.

* cited by examiner

Primary Examiner—Daniel J. Wu

(57) ABSTRACT

The system includes processors each of which can drop an optical signal contained in one channel of an incoming optical multiplex signal and add an optical signal to the multiplex signal channel thereby made available. Each processor includes an optical signal drop filter and an optical signal add filter for an individual channel of particular wavelength, and these filters are connected by an optical switch. The drop filters and the add filters of the circuits of the system are connected in series, some in a drop subsystem and the others in an add subsystem, to transmit the multiplex signal from one filter to the other and from the drop subsystem to the add subsystem. They are distributed in order of decreasing drop or add wavelength from the input of the system at which the incoming multiplex signal is received.

10 Claims, 2 Drawing Sheets

SYSTEM FOR ADDING/DROPPING WAVELENGTH DIVISION MULTIPLEXED OPTICAL SIGNALS

BACKGROUND OF THE INVENTION

The system is intended to be associated with an optical line transmitting a multiplex signal to enable some multiplexed optical signals to be dropped from it and other optical signals to be substituted for them using the wavelengths left available by the dropped signals.

Adding and dropping optical signals at particular wavelengths are operations which are indispensable to the communication of data in networks providing communication between geographically dispersed users. Systems therefore exist for this purpose and are used for injecting optical signals at predetermined wavelengths into multiplex signal transmission channels and selectively recovering data transmitted by the various channels. These drop-and-add systems are intended in particular for drop-and-add units providing selective service to users at selected locations in networks.

It is particularly important to obtain good performance in terms of optical signal transmission and in particular for the signals to suffer uniform losses during transmission, regardless of which wavelength from a particular range of available wavelengths is used to transmit data.

Also, signals which pass through a drop-and-add system on multiplex signal channels which are not dropped or added do not follow the same path as those which are added locally to the channels made available by the dropped signals. They are therefore not subject to the same insertion losses, which can lead to differences in the power levels of signals transmitted by different multiplex signal channels appearing at the output of a drop-and-add system. It is therefore important to prevent a system from causing penalizing insertion losses in some of the multiplexed optical signals that it transmits.

It has been found that these losses can be related to unequal attenuation at the various wavelengths used for the multiplex signal channels employed. Disturbances can also occur in the channels to which signals are added locally because of insufficient rejection of the dropped signals previously transmitted by those channels.

OBJECTS AND SUMMARY OF THE INVENTION

The invention therefore proposes a system for dropping/adding wavelength division multiplexed optical signals including an input and an output for an optical multiplex signal between which are added processors each of which is used for dropping an optical signal contained in one of "N" of the "M" channels of the incoming optical multiplex signal and adding an optical signal to the multiplex signal channel that is made available by the dropped signal.

According to a feature of the invention, each processor includes a drop optical filter and an add optical filter for an individual channel corresponding to a particular wavelength, an individual optical switch to which are connected a drop port of the drop filter, an individual add input, an individual drop output and an add port of the add filter, for dropping signals from and adding signals to a channel, and, to transmit the multiplex signal from one filter to the other for the purposes of dropping/adding signals, the drop filters of the circuits are connected in series from the input of the system and in order of decreasing channel wavelength in a drop subsystem, at the output of which the add filters are connected in series, and in order of decreasing channel wavelength in an add subsystem, a multiplex signal output port of each filter being connected to a multiplex signal input port of the next filter in the series, between the input and the output of the system, to which the input port of the first drop filter and the output port of the last add filter are respectively connected.

According to a feature of the invention, the difference between the insertion losses ($IL\_agg$) for the multiplexed optical signals passing through the system which cannot be added or dropped and the insertion losses ($IL\_AD$) for the multiplexed optical signals which are transmitted at the "N" channel wavelengths which can be dropped, as given by the expression $$IL\_AD - IL\_agg = IL\_drop + IL\_sw + IL\_add + (N+1) \times IL\_thru$$

is a minimum for the number N of processing circuits provided, $IL\_drop$ corresponding to the drop losses for a drop filter, $IL\_sw$ corresponding to the losses on passing through an optical switch, $IL\_add$ corresponding to the insertion losses for an add filter, and $IL\_thru$ corresponding to the through losses between multiplex signal input ports and multiplex signal output ports of a drop or add filter.

According to a feature of the invention, a rejection filter is incorporated in each circuit downstream of the multiplex signal output port of the drop filter of the circuit to increase therein the rejection level vis-à-vis the signal which is dropped there, the rejection filter being either directly between that output port and the multiplex signal input port of the drop or add filter immediately following it for alternate drop filters from the first of the series or between the input port of the add filter of the circuit and the output port of the add or drop filter immediately preceding it to which input port of that rejection filter is then connected.

According to a feature of one embodiment of the invention, each circuit includes two rejection filters to increase the rejection level of the circuit vis-à-vis the optical signal which is dropped there, one of the two filters being connected downstream of the multiplex signal output port of the drop filter of the circuit in the drop subsystem and the other upstream of the input port of the add filter of the circuit in the add subsystem.

According to a feature of the invention, a fixed level-adjusting attenuator is added between the output of the drop subsystem through which the multiplex signal from the last drop filter passes and the input port of the first filter of the add subsystem by which the multiplex signal is received.

According to a feature of the invention, a processor includes a drop filter whose drop port is connected to a first optical splitter to enable simultaneous transmission of the signal which it drops to the add filter of the circuit for re-insertion in the multiplex signal leaving the system and to an individual drop output of the system which is allocated to the circuit.

According to another feature, a processor includes a second optical splitter connected to an individual signal add input of the system to enable simultaneous transmission of the signal received from that input to the add filter of the circuit and to the individual drop output which is allocated to the circuit, such transmission being effected via at least one switch of the circuit.

According to another feature, the system includes optical splitters with two asymmetric outputs.

According to a final feature, the add, drop and rejection filters are of the MIF, IFBG, MZ-IFBG type or the fiber coupler type obtained by fusion-drawing and including a centrally located Bragg grating.

BRIEF DESCRIPTION OF THE DRAWINGS

The invention, its features and its advantages are explained in the following description, which is given with reference to the figures listed below.

MORE DETAILED DESCRIPTION

Figure 1:
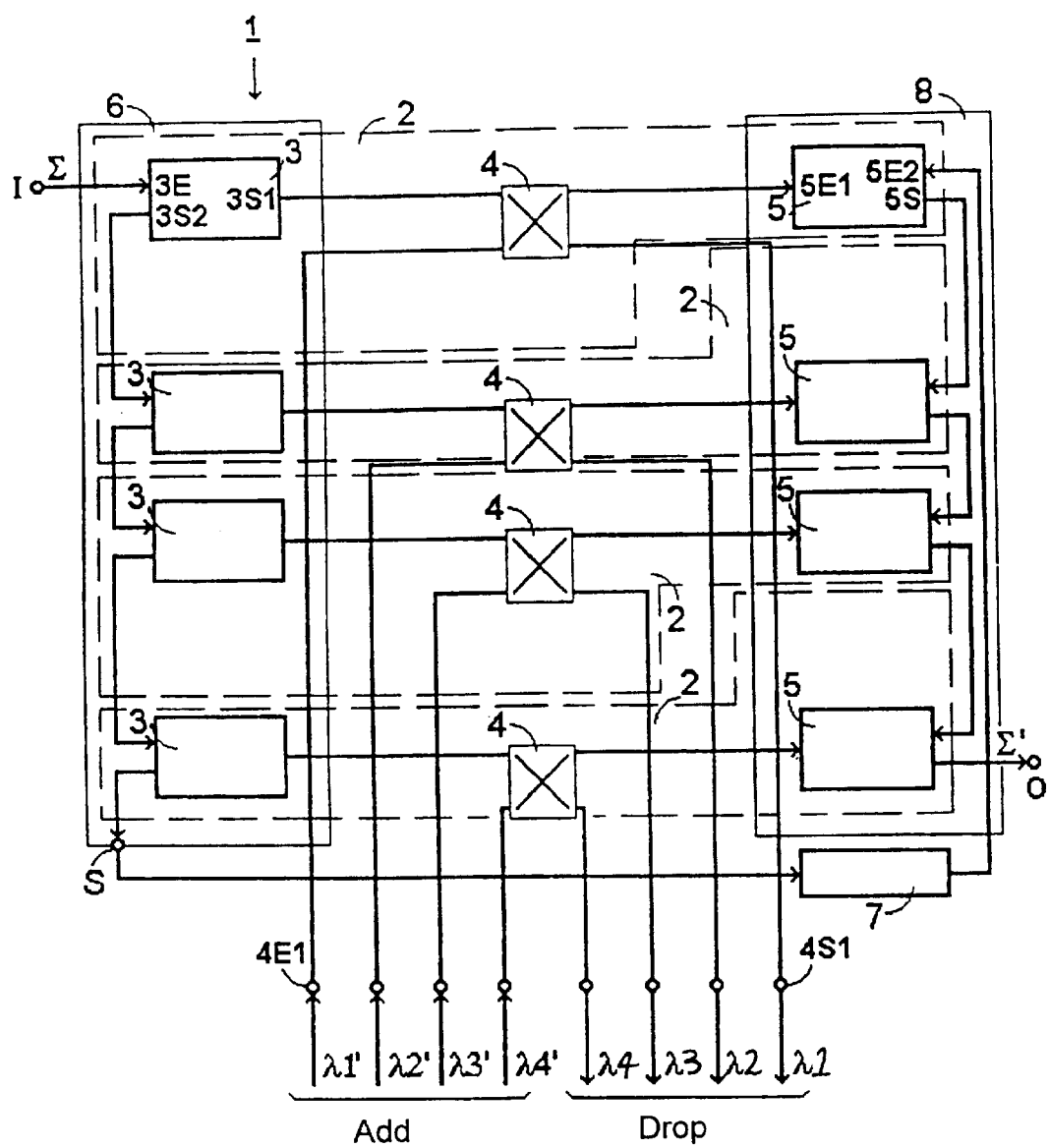
FIG. 1 is a block diagram of an example of a drop-and-add system in accordance with the invention.

The system 1 for dropping/adding wavelength division multiplexed optical signals shown in FIG. 1 is adapted to receive an optical multiplex signal $\Sigma$ at an input I. The multiplex signal $\Sigma$ is made up on an integer number "M" of multiplexed optical signals each transmitted by a channel having a particular optical wavelength, each channel having a different wavelength. A number "N" of the "M" multiplexed optical signals in the multiplex signal $\Sigma$ transmitted on channels corresponding to predetermined wavelengths can be dropped from the multiplex signal $\Sigma$ by the drop-and-add system. The system can add "N" optical signals from a different source to the "M-N" multiplexed optical signals passing through the system on channels corresponding to wavelengths at which no signals are dropped to produce a multiplex signal $\Sigma'$ at an output O of the system 1.

A series of "N" processing circuits 2 is provided in the drop-and-add system. Each circuit 2 includes selective filter means for one of the "N" wavelengths which can be dropped/added by the system 1 and optical switching means for orienting the signals which can be dropped or added within the system.

In the example proposed, each circuit 2 includes at least an optical drop filter 3, an optical switch 4 and an optical add filter 5.

The drop filters 3 provided for the various circuits 2 are assumed to be identical and each includes a multiplex signal input port 3E, a drop output port 3S1 for a signal on a particular channel and a through multiplex signal output port 3S2. They are connected in series between the input I of the system 1 and an output S of a drop subsystem 6 which they constitute. The input port 3E of a first of them receives the incoming multiplex signal $\Sigma$ via the input I. In the embodiment shown in FIG. 1, the input ports of the other drop filters 3 are each connected to the through port 3S2 of the preceding drop filter. Each of the other drop filters receives an optical multiplex signal which corresponds to the multiplex signal $\Sigma$ minus by the signal(s) dropped by the drop filter(s) preceding it in the drop subsystem 6.

The add filters 5 of the circuits 2 are identical and each includes an add port 5E1, an input port 5E2 and an output port 5S. They are connected in series between an attenuator 7 and the output O of the system 1 between which they form an add subsystem 8. The attenuator 7 is connected to the output S of the drop subsystem 6 and the input port 5E2 of the first add filter 5 in the add subsystem 8 is connected downstream of the attenuator 7. In the embodiment shown in FIG. 1, the input port 5E2 of each add filter 5 is connected to the output port 5S of the add filter which precedes it in the add subsystem 8.

The drop filters 3 and the add filters 5 can be IFBG (In Fiber Bragg Grating) filters. These filters can also be couplers obtained by fusion-drawing and having a Bragg grating in their central part or Bragg gratings associated with circulators. Multilayer Interference Filters (MIF) can also be used, as envisaged in connection with the variant shown in FIG. 2.

The optical switches 4 in the processing circuits 2 have two inputs and two outputs, for example. A first input of the optical switch 4 of a circuit 2 is connected to the drop port 3S1 of the drop filter 3 of the circuit so that the optical signal dropped by that filter can be switched either to a first output of the switch serving a corresponding local drop port 4S1 of the system 1 or to a second output of the switch which is connected to the add port 5E1 of the add filter 5 of the circuit 2 concerned. The second input of each optical switch 4 is connected to an individual add input 4E1 of the system for local substitution of an optical signal in the channel previously used by an optical signal dropped by the filter 3 of the circuit. The signal locally provided by an individual add input and transmitted to an add port SE1 can instead be switched to the drop port 4S1 of the circuit 2 that includes it, for example for test purposes, under the control of control means, not shown, which can operate the switches 4 of the system.

In the example shown in FIG. 1, the number "N" of processing circuits is four, each used for locally adding an optical signal, these signals using wavelengths $\lambda1'$, $\lambda2'$, $\lambda3'$ and $\lambda4'$ which are respectively equal to the wavelengths $\lambda1$, $\lambda2$, $\lambda3$, $\lambda4$ used for the signals dropped at the system 1.

As a general rule, the system 1 in accordance with the invention is preferably located between two amplifiers of the optical multiplex link with which it is associated for drop-and-add purposes. The channel optical wavelength specific to each processing circuit 2 is taken into account at the time of placing the circuit relative to the other circuits 2 in the system 1 including them. The aim of this is to take into account the variation of gain as a function of wavelength, known as "gain-tilt", which occurs in an optical amplifier through which a multiplex optical signal of the above kind is passed. This gain variation can be considered linear for a given power range at the input of the amplifier and results in a gain increasing in the opposite direction to the wavelength in the amplifier concerned.

The drop filters 3 of the system 6 and the add filters of the system 8 are therefore identically distributed as a function of the wavelength of the individual multiplex signal channel in which each filter drops or adds a signal. The lead filter in the system 6 or 8 is therefore the one processing the individual channel with the greatest wavelength and is successively followed by the other filters of the system in order of decreasing wavelength. The drop filter 3 of a processing circuit 2 has the same relative position in the drop subsystem 6 of the system including it as the add filter 5 of the same processor has in the add subsystem 8 of the system.

This minimizes output power level differences between drop ports for signals at wavelengths $\lambda1$, $\lambda2$, $\lambda3$, $\lambda4$ which are assumed to be decreasing and which appear at the individual drop outputs 4S1 of the system in the example shown in FIG. 1. The required input power level difference is likewise minimized for locally added signals, such as the signals at wavelengths $\lambda1'$, $\lambda2'$, $\lambda3'$ and $\lambda4'$, which are assumed to be decreasing.

The number "N" of processors 2 of a system 1, which is also the number of wavelengths that it can use, is determined allowing for the insertion losses affecting the various optical signals as they pass through the filters and the switches.

These losses include those affecting the dropped optical signal and the multiplex signal passing through each drop filter. In the example shown in FIG. 1, these losses are those occurring between the input port 3E and the drop port 3S1 for a dropped signal and between the input port 3E and the through port 3S2 for the multiplex signal minus the dropped signal.

These losses are also those affecting a signal added to a multiplex signal at an add filter and the multiplex signal passing through the filter and to which the signal is added. In the example shown in FIG. 1, these losses are those occurring between the add port 5E1 and the output port 5S of the filter for the added signal and between the input port 5E2 and the same output port 5S in the same filter for the multiplex signal received by that filter.

These losses are those introduced by the optical switch 4 of a circuit.

To be more precise, the insertion losses for the multiplexed optical signals passing through a system 1, without the possibility of dropping or adding signals, are here given by the formula:

$$IL\_agg = 2N \times 1L\_thru$$

where IL_thru corresponds to through losses occurring between the multiplex signal input and the multiplex signal output, i.e. between the input port 3E and the through port 3S2 for a drop filter 3 or between the input port 5E2 and the output port 5S for an add filter 5.

The insertion losses affecting a signal added at a wavelength which can be dropped are here given by the formula:

$$IL\_AD = IL\_drop + IL\_sw + IL\_add + (2N-2-n) \times IL\_thru$$

where:

IL_drop represents drop losses occurring between the input port 3E and the drop port 3S for a drop filter 3, IL_sw represents the losses occurring at the optical switch 3 passed through, IL_add represents the losses occurring between add port 5E1 and output port 5S for an add filter 5, and "n" corresponds to the number of filters between the through port 3S2 of a drop filter and the input port 5E2 of the add filter of the same circuit.

The ratings of a system 1 whose components (e.g. filters and switches) have known losses are determined by choosing a number "N" which minimizes the expression:

$$IL\_AD - IL\_agg = IL\_drop + IL\_sw + ILadd + -(N+1) \times IL\_thru = k$$

It is therefore a function of the technological choices made.

For example, if MIF filters are used for the drop and add filters and the loss values are as follows:

$$IL\_drop = IL\_add = 1.5dB, IL\_thru = 0.7dB, IL\_sw = 1db,$$

the number "N" corresponds to INT(3.4/0.7) =5, given that INT(x), the function approximating x, corresponds to its nearest integer value.

The discontinuous nature of this function INT(x) fixes the upper limit in optimizing the uniformity that can be obtained without imposing excessively rigid constraints on the choice of a number N.

If IL_drop +IL_sw +IL_add +(N +1)×IL_thru is greater than zero, it is possible to implement an attenuator (e.g. the attenuator 7 in FIG. 1) with a value equal to k which maximizes the uniformity between signals for a system 1 with a given value of "N".

As already indicated, the attenuator operates on wavelength division multiplexed signals constituting the multiplex signal transmitted from the output S of the drop subsystem 6 to the input port 5E2 of the first add filter 5 of the add subsystem 8, reducing their level relative to that of the signals added by means of the various add filters 5.

Figure 2:
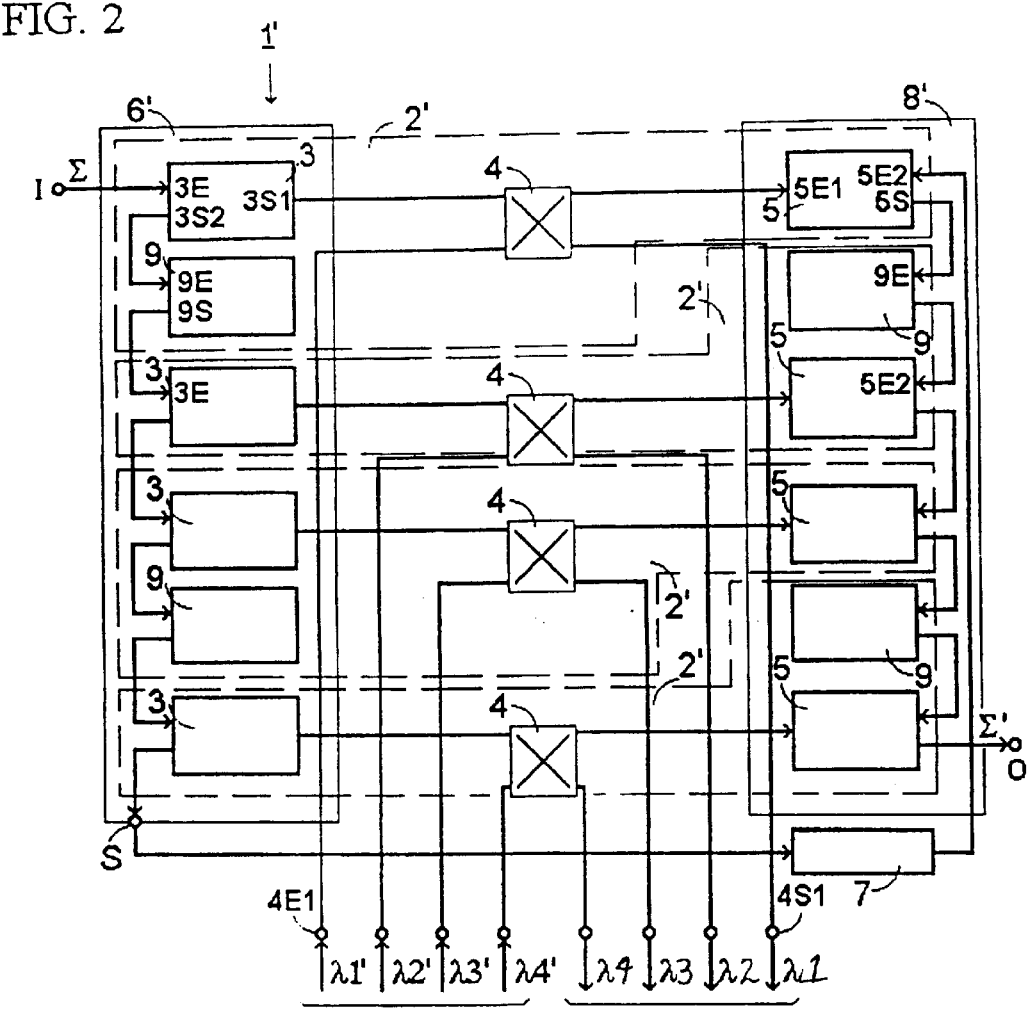
FIG. 2 is a block diagram of a variant drop-and-add system in accordance with the invention.

The first variant shown in FIG. 2 is more particularly intended for the situation in which the rejection specific to each filter is not sufficient to eliminate all possibility of a residue of the optical signal dropped from an individual channel being added to a signal locally added to that channel in order to be transmitted to the output O of the system 1.

This can be the case in particular if the drop filters 3 and the add filters 5 are MIF filters and cannot in isolation provide the necessary level of rejection, each filter having a rejection level in the order of only 10 dB, for example.

To this end, a rejection filter 9 can be added to each processor 2' in order to raise the overall rejection level of the circuit. If the rejection filters 9 added are MIF filters, the overall rejection level achieved per processor is then in the order of 30 dB, which is deemed to be sufficient. These filters are either of the type previously referred to or MZ-IFBG (Mach-Zehnder In Fiber Bragg Grating) filters in which the Bragg gratings are in a fiber Mach-Zehnder structure.

In a preferred embodiment, the rejection filters 9 of a system 1' are divided alternately between the two drop and add subsystems 6' and 8' of the system, for example one downstream of the odd drop filters and the other upstream of the even add filters.

In the variant shown in FIG. 2, the rejection filter 9 of the first circuit 2', corresponding to the greatest wavelength, is placed in the drop subsystem 6' between the through port 3S2 of the drop filter 3 of the first circuit and the input port 3E of the drop filter 3 of the circuit 2' which follows it and which therefore corresponds to the next wavelength lower than that of the first circuit.

In contrast, the rejection filter 9 of the second circuit is placed in the add subsystem 8' between the output port 5S of the drop filter 3 of the first circuit and the input port 5E2 of the add filter 5 of the next circuit 2' which includes it, and so on for the other rejection filters, according to whether the respective circuits including them are odd or even.

Whichever case applies, each rejection filter 9 is connected by an input port 9E, at which it receives the multiplex signal transmitted to it by the filter 3 or 5 which it follows, and by an output port 9S of the filter 3 or 5 which it precedes.

Figure 3:
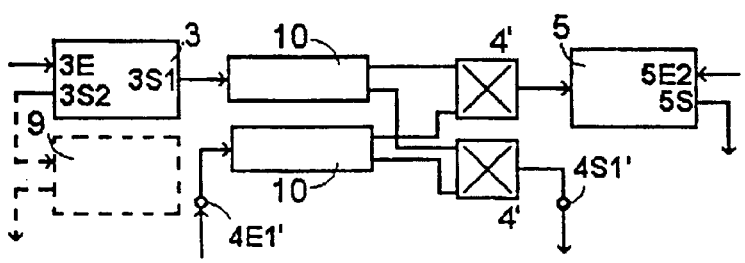
FIG. 3 is a block diagram relating to a second variant of a drop-and-add system in accordance with the invention.

The implementation shown in FIG. 3 corresponds to a variant of the processor which is more particularly provided for add/drop subsystems in which a wavelength division multiplexed optical signal is transmitted simultaneously in two different directions, one of which is that of the multiplex signal from which it was obtained.

It includes an optical splitter 10 between the drop filter 3 of the processor and one of two inputs of a first switch 4' which differs from the switch 4 in that it has only one active output. The optical splitter 10 which is connected to the drop port 3S1 of the drop filter 3 is also connected to one of two inputs of a second switch 4' whose single output is connected to an individual drop output 4S1' of the system which is specific to the circuit. The signal received by the optical splitter 10 is therefore transmitted to the individual drop output 4S1' and to the add port of the add filter 5 of the circuit concerned, to which the single output of the first switch 4' is connected.

The processor concerned includes a second optical splitter 10' between an individual add input 4E1' of the system and a second input of each of the two switches 4'. This second splitter is used to transmit an optical signal arriving at the individual add input 4E1' to be transmitted via the individual drop output 4S1' mentioned above and to be added to the channel of the multiplex signal received via input port 5E2 of the add filter 5 that was previously occupied by the signal that was dropped by the filter 3 of the same circuit.

In a preferred embodiment, the optical splitters 10 have asymmetric outputs so that the level of the dropped signal which is re-injected by a processor into the multiplex signal leaving the system is only very slightly reduced, the level of the dropped signal which is transmitted to the individual drop output 4S1' being consequently reduced to a value such that it can be taken into account, for example after amplification carried out in a manner that is not shown.

What is claimed is:

1. A system for dropping/adding wavelength division multiplexed optical signals including an input and an output for an optical multiplex signal between which are processors each of which is used for dropping an optical signal contained in one of "N" of the "M" channels of the incoming optical multiplex signal and adding an optical signal to the multiplex signal channel that is made available by the dropped signal, wherein each processor includes a drop optical filter and an add optical filter for an individual channel corresponding to a particular wavelength, an individual optical switch to which are connected a drop port of the drop filter, an individual add input, an individual drop output and an add port of the add filter, for dropping a signal from and adding a signal to a channel, and wherein, to transmit the multiplex signal from one filter to the other for the purposes of dropping/adding signals, the drop filters of the circuits are connected in series from the input of the system and in order of decreasing channel wavelength in a drop subsystem at the output of which the add filters are connected in series and in order of decreasing channel wavelength in an add subsystem, a multiplex signal output port of each filter being connected to a multiplex signal input port of the next filter in the series, between the input and the output of the system, to which the input port of the first drop filter and the output port of the last add filter are respectively connected.

2. A system according to claim 1, wherein the difference between the insertion losses for the multiplexed optical signals passing through the system which cannot be added or dropped and the insertion losses for the multiplexed optical signals which are transmitted at the "N" channel wavelengths which can be dropped, as given by the expression $$IL\_AD-IL\_agg=IL\_drop+IL\_sw+IL\_add+-(N+1) \times IL\_thru$$

is a minimum for the number N of processing circuits provided,

IL_drop corresponding to the drop losses for a drop filter,
IL_sw corresponding to the losses on passing through an optical switch, IL_add corresponding to the insertion losses for an add filter and IL_thru corresponding to the through losses between multiplex signal input ports and multiplex signal output ports of a drop or add filter.

3. A system according to claim 1, wherein the number of processors is equal to 4.

4. A system according to claim 1, wherein a rejection filter is incorporated in each circuit downstream of the multiplex signal output port of the drop filter of the circuit to increase therein the rejection level vis-à-vis the signal which is dropped there, the rejection filter being either directly between that output port and the multiplex signal input port of the drop or add filter immediately following it for alternate drop filters from the first of the series or between the input port of the add filter of the circuit and the output port of the add or drop filter immediately preceding it to which input port of that rejection filter is then connected.

5. A system according to claim 1, wherein each circuit includes two rejection filters to increase the rejection level of the circuit vis-à-vis the optical signal which is dropped there, one of the two filters being connected downstream of the multiplex signal output port of the drop filter of the circuit in the drop subsystem and the other upstream of the input port of the add filter of the circuit in the add subsystem.

6. A system according to claim 1, wherein a fixed level-adjusting attenuator is added between the output of the drop subsystem through which the multiplex signal from the last drop filter passes and the input port of the first filter of the add subsystem by which the multiplex signal is received.

7. A system according to claim 1, wherein a processor includes a drop filter whose drop port is connected to a first optical splitter to enable simultaneous transmission of the signal which it drops to the add filter of the circuit for re-insertion in the multiplex signal leaving the system and to an individual drop output of the system which is allocated to the circuit.

8. A system according to claim 7, wherein a processor includes a second optical splitter connected to an individual signal add input of the system to enable simultaneous transmission of the signal received from that input to the add filter of the circuit and to the individual drop output which is allocated to the circuit, such transmission being effected via at least one switch of the circuit.

9. A system according to claim 7, including optical splitters with two asymmetric outputs.

10. A system according to claim 1, wherein the add, drop and rejection filters are of the MIF, IFBG, MZ-IFBG type or the fiber coupler type obtained fusion-drawing and including a centrally located Bragg grating.

* * * * *

UNITED STATES PATENT AND TRADEMARK OFFICE
CERTIFICATE OF CORRECTION

PATENT NO.    : 6,498,665 B1
DATED         : December 24, 2002
INVENTOR(S)   : Corinne Chauzat et al.

It is certified that error appears in the above-identified patent and that said Letters Patent is hereby corrected as shown below:

<u>Title page,</u>
Insert the following:
-- [73] Assignee:     Alcatel, Paris (FR) --

Signed and Sealed this

Twenty-ninth Day of July, 2003

JAMES E. ROGAN
*Director of the United States Patent and Trademark Office*